United States Patent [19]

Tokuyama

[11] Patent Number: 4,510,533
[45] Date of Patent: Apr. 9, 1985

[54] SYSTEM FOR REPRODUCING A VIDEO SIGNAL IN A SLOW MOTION OR STILL PICTURE REPRODUCTION

[75] Inventor: Yoshio Tokuyama, Yokohama, Japan

[73] Assignee: Victor Company of Japan, Ltd., Yokohama, Japan

[21] Appl. No.: 519,881

[22] Filed: Aug. 3, 1983

Related U.S. Application Data

[63] Continuation of Ser. No. 267,083, May 26, 1981, abandoned.

[30] Foreign Application Priority Data

May 26, 1980 [JP] Japan .................................. 55-69870

[51] Int. Cl.³ ............................................ G11B 21/10
[52] U.S. Cl. .................................. 360/10.2; 360/10.3; 360/70; 360/77
[58] Field of Search ...................... 360/10, 74.1, 74.4; 360/10.3, 10.2, 10.1, 70, 75, 77, 7; 369/60, 50

[56] References Cited

U.S. PATENT DOCUMENTS

| 3,777,054 | 12/1973 | Loughry | 360/11.1 |
| 3,968,518 | 7/1976 | Kihara | 360/10 |
| 4,246,616 | 1/1981 | Hiraguri | 360/10 |

FOREIGN PATENT DOCUMENTS

| 1903409 | 8/1970 | Fed. Rep. of Germany | 360/10.1 |
| 2835837 | 2/1979 | Fed. Rep. of Germany | 360/10.1 |
| 2941737 | 4/1980 | Fed. Rep. of Germany | 360/10.1 |
| 2930983 | 2/1981 | Fed. Rep. of Germany | 360/10.1 |
| 2358796 | 2/1978 | France | 360/10.1 |
| 2439523 | 5/1980 | France | 360/10.1 |
| 2462831 | 2/1981 | France | 360/10.1 |
| 1415035 | 11/1975 | United Kingdom | 360/10.1 |
| 1427100 | 3/1976 | United Kingdom | 360/10.1 |
| 2009998 | 6/1979 | United Kingdom | 360/10.1 |
| 2036407 | 6/1980 | United Kingdom | 360/10.1 |
| 2056153 | 3/1981 | United Kingdom | 360/10.1 |
| 1587798 | 4/1981 | United Kingdom | 360/10.1 |

OTHER PUBLICATIONS

Patent Abstracts of Japan, vol. 3, No. 127 (E-146), Oct. 23, 1979; & Japanese Published application 54 104229, (8-16-1979).

Primary Examiner—Alan Faber
Attorney, Agent, or Firm—Louis Bernat

[57] ABSTRACT

A video signal reproducing system performs a still-picture reproduction or a slow-motion reproduction. A reproducing circuit picks up a recorded video signal and control signal which are fed to a reproducing circuit. A control head of the reproducing circuit is located at a position which is displaced from a standard position by a predetermined distance. The control signal which is reproduced by the control head is displayed by a delay time corresponding to the distance by which the control head is displaced from a standard position.

11 Claims, 22 Drawing Figures

SYSTEM FOR REPRODUCING A VIDEO SIGNAL IN A SLOW MOTION OR STILL PICTURE REPRODUCTION

This is a file wrapper continuation of Ser. No. 267,083, filed May 26, 1981, and now abandoned.

BACKGROUND OF THE INVENTION

The present invention relates generally to a system for reproducing video signals from a magnetic tape in such a manner of obtaining a slow-motion reproduction picture, or a still reproduction picture, and more particularly to a system for carrying out slow-motion reproduction and still picture reproduction without accompanying any noises or beats on a reproduced picture screen.

The prior art uses a system wherein a video signal is recorded on a magnetic tape on parallel tracks formed obliquely to the longitudinal direction of the magnetic tape. This tape travels at a tape speed which is different from that used at the time of recording or stops thereby to carry out speed-change reproduction such as quick-motion reproduction, slow-motion reproduction, or still picture reproduction. In this system, the tape speed at the time of speed-change reproduction is different from that at the time of recording, therefore the path (track) which the head traces on the tape during reproduction is different from the path (track) traced by the head during recording.

On the one hand, a conventional video signal recording and reproducing system, ordinarily, forms tracks on a recording medium in a manner which leaves an unrecorded zone or band called a guard band between neighboring tracks in order to prevent the generation of beats caused by the reproduced signals of neighboring tracks due to tracking deviation of the head at the time of reproduction. When a tape recorded in this manner is played back by speed-change reproduction as described above, the head traces over the track and the unrecorded band. When the head traces over the unrecorded band, the reproduced signal is remarkably lowered in level or disappears. For this reason, a noise is generated in the reproduced picture. Furthermore, in the above mentioned system, since unrecorded bands are provided between tracks, the utilization efficiency of the tape has been poor.

Accordingly, the present applicant has previously described a system wherein tracks are formed on a tape without gaps between neighboring tracks, and, moreover, a color video signal can be recorded and reproduced without the occurrence of beat disturbance, in the U.S. patent application Ser. No. 731,935 entitled "Color video signal recording and/or reproducing system" filed Oct. 13, 1976, now U.S. Pat. No. 4,178,606, issued Dec. 11, 1979 and assigned to the same assignee as that of this application. In this previously described system, a pair of azimuth heads having gaps which are inclined with a certain azimuth angle in mutually opposite directions with respect to the direction perpendicular to the longitudinal direction of the track are used, and neighboring tracks are formed in contiguous contact side-by-side without a gap therebetween. Furthermore, the phase of the chrominance signal is shifted by 90 degrees for every horizontal scanning period, and, moreover, the direction of this phase shifting is reversed from one track to the neighboring track. In accordance with this system, the tape utilization efficiency is high since the tracks are in close contact with each other, and, moreover, there is no occurrence of beat disturbance.

Then, the present applicant has proposed a new system wherein, in addition to adoption of the above described system, a plurality of rotating heads having gaps the centers thereof in the track width direction being different in height positions with respect to the rotational planes in which the heads travels are used, and the magnetic tape is caused to travel at a speed V which is represented by the equation $$V = V_0 \left( \frac{n-1}{n} \right),$$

wherein Vo is the tape speed for normal reproduction (and recording), and n is a positive or negative integer, or to stop thereby to carry out slow-motion reproduction or still picture reproduction, in the U.S. patent application Ser. No. 892,147 entitled "Video Signal Speed-Change Reproducing System" filed on Mar. 31, 1978, and assigned to the assignee of this application, and subsequently abandoned. A continuation-in-part application Ser. No. 58,818 was filed on July 19, 1979, and issued as U.S. Pat. No. 4,342,053 on July 27, 1982.

This latter proposed system is capable of carrying out slow-motion reproduction or still picture reproduction with least noise. However, the magnetic tape is required to travel at the speed satisfying the above given equation, which gives rise to a problem in that slow motion reproduction at any given speeds can not be carried out. Moreover, when the traveling magnetic tape is to be stopped for still picture production, the position where the magnetic tape stops is not controlled. Accordingly, the operator is required to search the position where the magnetic tape stops with least or no noise while observing the reproduced picture screen. Thus, there arises a problem in that operation becomes rather troublesome.

Accordingly, in the U.S. Pat. No. 4,246,616 in which the assignee is the same as that of the present application, a system for reproducing a video signal in a slow motion or still picture reproduction was proposed, in which the above described problems were overcome.

This previously proposed system for reproducing a video signal in a slow motion or still picture reproduction comprises a tape on which video signals are recorded along video tracks, which extend obliquely to the longitudinal direction of the tape with substantially no space therebetween. A control signal is recorded along a control track extending in the longitudinal direction, the video tracks being recorded by a plurality of rotating video heads having gaps of mutually different azimuth angles. The control signal is recorded along the control track interrelatedly with the recording of the video tracks by the video heads. A motor drives the tape in tape travel or stops the tape. A plurality of rotating, reproducing video heads successively trace the video tracks to pick up and reproduce the recorded video signals. The rotating video heads have gaps which have mutually different azimuth angles that are respectively the same as the first mentioned azimuth angles, and which have different height positions above the plane of rotation of the centers of the tracks in the width direction thereof. The control signals are reproduced from the control track of the traveling tape. A circuit delays the reproduced control signal by a specific time to obtain a delayed signal and uses this delayed signal to stop the motor and therefore the tape travel. The tape is stopped at a position relative to the reproducing video heads at which the reproduction is accomplished so that the time instant when the level of the reproduced video signal becomes a minimum is within or in the vicinity of the vertical blanking period.

According to this previously proposed system, still picture reproduction in the above mode is carried out in a state without generating noise, whereby the slow-motion reproduction is carried out without generating noise as a whole. By selecting the above described still picture reproducing period at will, slow motion reproduction can be carried out at a given slow motion ratio.

Accordingly, when the inertia of the tape moving and driving system including a capstan motor, capstan, and flywheel, is set to a small value, the wow and flutter upon tape moving period in normal recording and reproduction is large, and stable tape movement cannot be performed. Therefore, when measures are taken to stably move the tape, the inertia of the above tape moving and driving system becomes large.

Since the magnetic tape must be stopped at a most suitable position with respect to the video head, there is a limit to the distance (time) between point (time) of detection of the control signal and the point (time) of stopping of the movement, from this point of view. Thus, when the inertia of the tape moving and driving system is large as in the above case, the delay quantity of the above control signal must be exceedingly small. Accordingly, the time constant of the monostable multivibrator which performs the delaying operation must be exceedingly small.

When the above time constant of the monostable multivibrator is set to an exceedingly small value, the time constant can be adjusted towards the positive direction, that is, the time constant can be adjusted towards a direction which increases the value of this time constant, upon adjustment of the reproducing apparatus so that the noise bar is not seen in the reproduced picture according to the inconsistency of the reproducing apparatus. However, adjustment of the time constant towards the negative direction was difficult, that is, adjustment of the time constant towards a direction which decreases the value of this time constant was difficult, since the original value of the time constant is exceedingly small.

SUMMARY OF THE INVENTION

Accordingly, a general object of the present invention is to provide a novel and useful system for reproducing a video signal in a slow motion or still picture reproduction, in which the above described problems have been overcome.

Another and more specific object of the present invention is to provide a system for reproducing a video signal in a slow motion or still picture reproduction in which the position of the control head is arranged at a position deviated by a distance corresponding to approximately one-half of the maximum variable quantity of the tape stopping position adjustment, from a predetermined position in the above described proposed system and the like, the control signal reproduced by this control head is delayed by a time constant having considered the deviated quantity of the position of the control head, and the tape stopping position upon intermittent tape movement is determined according to this control signal. According to the system of the present invention, the above time constant can be variably adjusted towards both the positive and negative directions even when the inertia of the tape moving and driving system is set to a slightly large value. Moreover, fine adjustment can be performed so that the noise bar is never introduced into the picture upon slow motion or still picture reproduction.

Further objects and features of the invention will be apparent from the following detailed description when read in conjunction with the accompanying drawings.

BRIEF DESCRIPTION OF THE DRAWINGS

FIGS. 2(A) through 2(G) are diagrams respectively indicating the waveforms of signals at various parts of the block diagram shown in FIG. 1;

FIGS. 8(A) through 8(H) respectively are graphs showing signal waveforms at each part of the block system shown in FIG. 6.

DETAILED DESCRIPTION

Figure 1:
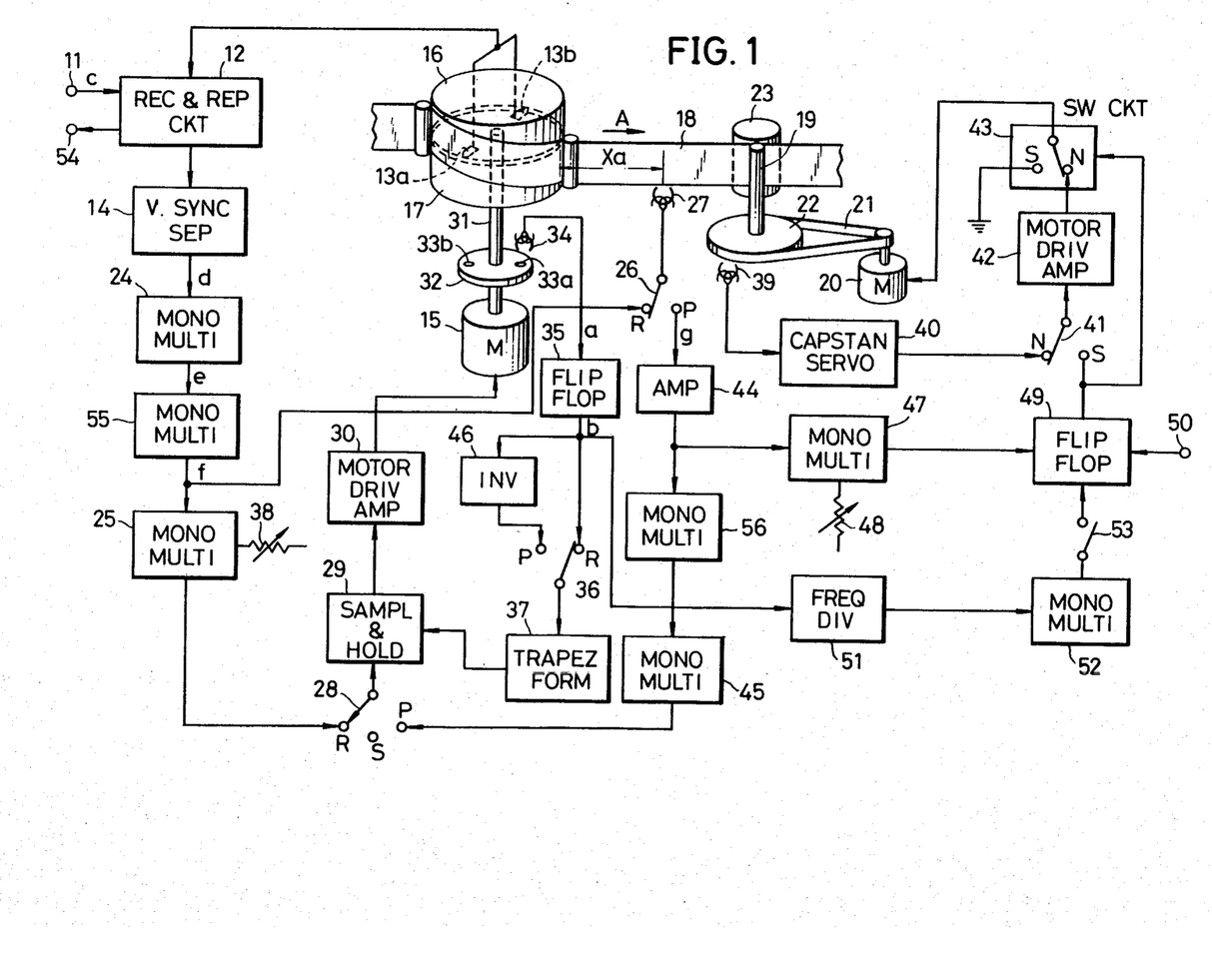
FIG. 1 is a block diagram of a first embodiment of the video signal slow motion reproduction and still picture reproduction system according to the present invention.
Figure 2:
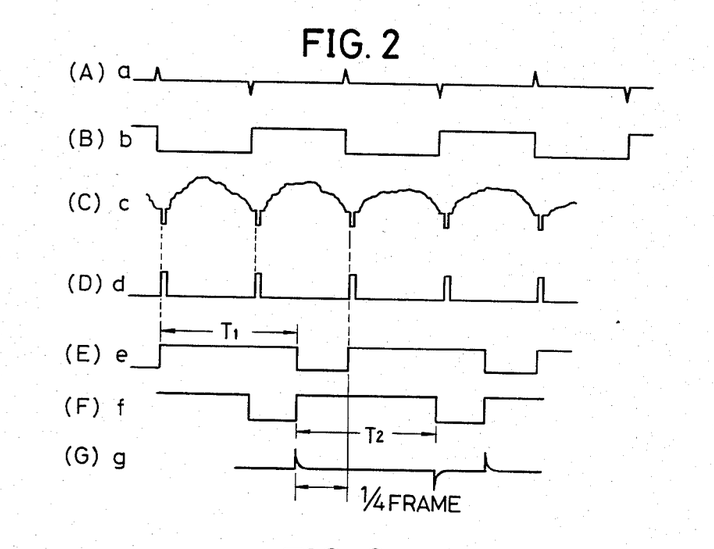

Referring first to FIG. 1 a video signal C shown in FIG. 2(C) which is to be recorded, is introduced into the system shown through an input terminal 11 and is passed through a recording and reproducing circuit 12 and supplied to a pair of recording and reproducing video heads 13a and 13b and to a vertical synchronizing signal separation circuit 14. The video heads 13a and 13b have mutually opposite azimuths and mutually different track widths as described hereinafter and are mounted on diametrically opposite sides of a rotary drum 16 rotated at a rotational speed of 30 rps. by a motor 15. A magnetic tape 18 is wrapped obliquely around the rotary drum 16 and a stationary drum 17 and is driven to travel in the arrow direction A by a capstan 19 driven by a motor 20 through a belt 21 and a flywheel 22, and a pinch roller 23. A video signal is recorded by the video heads 13a and 13b alternately along tracks on the tape 18, successively one field per track, the tracks being resultingly positioned contiguously to each other and obliquely relative to the longitudinal direction of the tape.

On the other hand, a vertical synchronizing signal d (FIG. 2(D)) of 60 Hz which has been separated from the video signal c in the vertical synchronizing signal separation circuit 14 is supplied to a monostable multivibrator 24, where its frequency is halved to 30 Hz. The resulting output signal e indicated in FIG. 2(E) is supplied to a monostable multivibrator 55. The monostable multivibrator 55 is triggered at the falling edge of the signal e, and produces a square wave f shown in FIG.

2(F) having a positive polarity and a pulse width T2. This square wave f is delayed by a time corresponding to the pulse width T1 of the signal e with respect to the vertical synchronizing signal d. Furthermore, the rising part of the square wave f is at a position where the phase is equivalently advanced by ¼ frame with respect to the vertical synchronizing signal d.

The above signal f is recorded as a control signal on the lower edge of the tape 18 by a control head 27 provided at a position which will be described hereinafter, through a switch 26 with its moving contact connected to a contact point R in a recording mode. In addition, the signal f is also supplied to a monostable multivibrator 25. The resulting output signal of the monostable multivibrator 25 for phase adjustment is supplied, by way of a switch 28 with its moving contact connected to a contact R, to a sample and holding circuit 29.

The above mentioned rotary drum 16 is coaxially mounted on a rotating shaft 31, which is driven by the motor 15 and rotates together with the rotary drum 16. A pair of magnets 33a and 33b of opposite polarity are mounted on a rotating disc 32 fixed coaxially to the rotating shaft 31. Together with rotation of the rotary drum 16, pulses a of positive polarity and negative polarity as indicated in FIG. 2(A) are obtained alternately by a pickup head 34 and are supplied to a flip-flop 35. The resulting output b of the flip-flop 35 of the waveform indicated in FIG. 2(B) is supplied, by way of a switch 36 with its moving contact connected to a contact R, to trapezoidal wave forming circuit 37 and formed into a trapezoidal wave signal which is then supplied to the sampling and holding circuit 29.

The present embodiment is designed so that, when the output signal b of the flip-flop 35 is at its low level, the video head 13a scans the tape, and when the output signal b is at its high level, the other video head 13b scans the tape.

In the sampling and holding circuit 29, the trapezoidal wave signal is sampled in its inclined part by the sampling pulse and a slope part. Thus, the sampled pulse is held. The resulting output signal of the sampling and holding circuit 29 is supplied through a motor driving amplifier 30 to the motor 15 thereby to control the rotation thereof. The rotational phase of the motor 15 is so controlled that the sampling position on the trapezoidal wave in the sampling and holding circuit 29 will become a specific position, for example, the middle position of the inclined part of the trapezoidal wave signal.

According to the above described controlling operation, the video heads 13a and 13b are rotated with their rotational phase maintaining a specific relationship with the phase of the vertical synchronizing signal of the input video signal. Adjustment of this phase relationship is made by adjusting the time constant of the monostable multivibrator 25, which time constant is adjusted by a variable resistor 38.

On the other hand, as the capstan 19 rotates, a pick-up head 39 detects the rotation of the capstan 19, in cooperation with magnets (not shown) mounted on the flywheel 22. The signal thus detected is supplied to a capstan servo circuit 40, where an error with respect to the reference speed is detected. The resulting output control signal of the capstan servo circuit 40 is passed through a switch 41 with its moving contact connected to a contact point N, a motor driving amplifier 42, and a switch circuit 43 with its moving contact connected to a contact N, and is then supplied to the motor 20 thereby to control the rotation thereof. Accordingly, the capstan 19 causes the magnetic tape 18 to travel at a constant speed such that it is shifted by an amount corresponding to one track pitch during the period of time when the video heads 13a and 13b rotate over one-half of complete single rotation respectively.

At the time of normal reproduction, the moving contacts of the switches 26, 28 and 36 are respectively switched to their contact points P, and the switch 41 and the switch circuit 43 are held with their moving contacts being connected to the contact points N. The control head 27 reproduces control signal g with a waveform as indicated in FIG. 2(G) which is supplied through the switch 26 and an amplifier 44 to a monostable multivibrator 56. The resulting output signal of the monostable multivibrator 56 is supplied to a monostable multivibrator 45. The output of the monostable multivibrator 45 is supplied through the switch 28 to the sampling and holding circuit 29. On the other hand, the output signal of the flip-flop 35 is phase inverted by a phase inverter 46, and is then supplied through the switch 36 to the trapezoidal wave forming circuit 37. From the trapezoidal wave forming circuit 37, is derived a trapezoidal wave signal which is in the polarity opposite to that of the trapezoidal wave signal at the time of recording. The trapezoidal wave signal is supplied to the sampling and holding circuit 29, where it is subjected to sampling by the above mentioned sampling signal from the monostable multivibrator 45. Responsive to the output signal of the sampling and holding circuit 29, the motor 15 is controlled its rotation.

The video signal picked up or reproduced by the video heads 13a and 13b passes the recording circuit 12, and is led out through a terminal 54.

Since the gaps of the video heads 13a and 13b respectively have mutually opposite azimuths, no signal is reproduced due to azimuth losses is the case where the video heads 13b and 13a respectively scan the tracks recorded by the video heads 13a and 13b (i.e., where so-called reverse tracking is carried out). Then, at the time of normal reproduction, the rotational phase of the motor 15 is so controlled that the sampling signal which has been formed by the monostable multivibrator 45 responsive to the pulses of positive polarity in every two fields from the control head 27, as described above, will sample the middle part of the slope of the trapezoidal wave signal formed in correspondence with pulses of positive polarity from the control head 27. In this case, the pulses of positive polarity from the control head 27 are so set that they are generated in coincidence with the rotational position of, for example, the head 13a. For this reason, in a normal reproduction mode, the rotational phases of the video heads 13a and 13b are so controlled that these heads will always scan (positive tracking) the tracks recorded by these heads 13a and 13b respectively, and the above mentioned reverse tracking does not occur.

Figure 3:
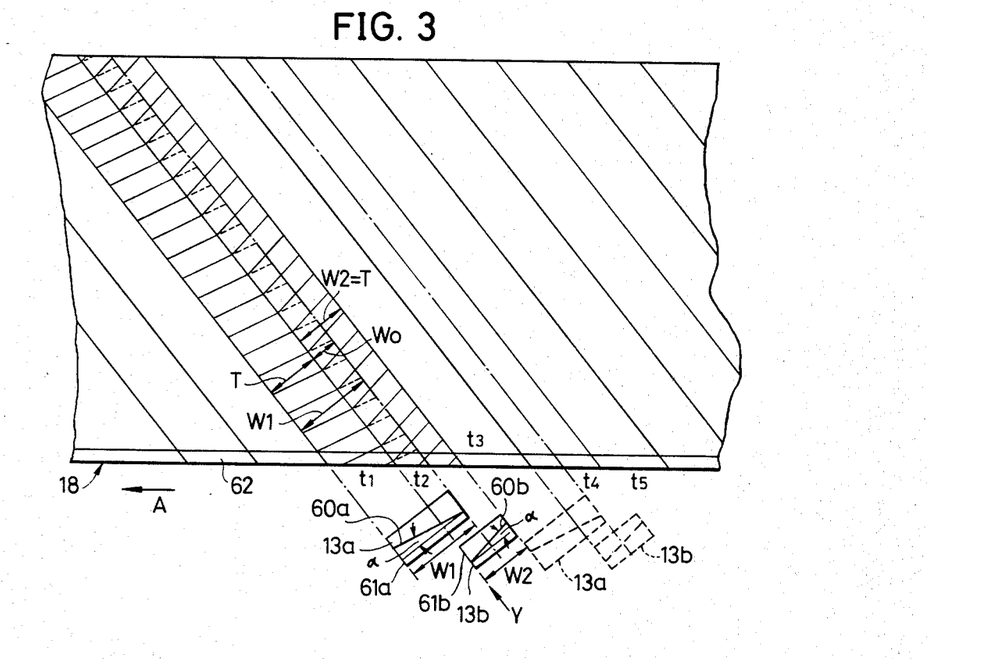
FIG. 3 is a diagram indicating a track pattern at the time of recording.

The video heads 13a and 13b, as shown in FIG. 3, respectively have gaps 60a and 60b inclined by an angle mutually in the opposite direction relative to the direction perpendicular to the scanning direction, that is, have azimuths of the angle α. These video heads 13a and 13b have respectively different track widths W1 and W2 and are so provided that their respective end faces 61a and 61b are at the same reference face of the rotary drum 16. In the present embodiment of the invention, the width W1 is substantially equal to 1.5 W2 through 1.6 W2.

Video signal recorded tracks are formed on the tape 18 by the heads 13a and 13b in the following manner. When the head 13a rotating in the arrow direction Y scans the tape 18 traveling in the arrow direction A, a recorded track of the width W1 is formed obliquely to the longitudinal direction of the tape. Next, when the head 13b scans the tape 18 with an overlap of a width Wo over the track previously formed by the head 13a, a recorded track of the width W2 (=T) is formed. Here, the overlap width Wo is so set that $Wo = W1 - T$.

Then, since the recorded video signal has been frequency modulated, when a head scans and records a new signal with overlap over a track part which has been previously recorded, the previously recorded signal is erased by the bias effort of this new signal, and the new signal is recorded, as in known systems. Consequently, the signal recorded by the head 13a remains as a track t1 of the width T, while the signal recorded by the head 13b remains as a track t2 of the width T. Similarly thereafter, tracks t3, t5, t7, . . . (wherein the subscripts of t are odd numbers) of width T are formed by the recording of the head 13a and the erasing effect of the head, and tracks t4, t6, t8 . . . (wherein the subscripts of t are even numbers) of width T are formed by the recording of the head 13b.

In this connection it is to be understood that, in order to form the tracks in close contact in this manner, it is not absolutely necessary to use heads of different track widths as described above, it being possible to use heads of the same track width. In the practice of the system of the present invention, however, it is necessary that the track widths of the reproducing heads by different for the purpose of speed-change reproduction as described hereinafter, and since recording also can be carried out by means of these reproducing heads, the above description has been set forth.

In this case, the tracks t1, t2, t3 . . . are in contiguous contact without gaps therebetween, whereby the tape utilization efficiency is high. Each track is recorded with a part of a video signal corresponding to substantially one field.

Here, the angle between the video heads 13a and 13b, and the magnets 33a and 33b, and the time constant of the monostable multivibrator 25 are so adjusted that a vertical synchronizing signal is positioned near an end of the track. A control signal is recorded at the lower lateral edges of the tape 18 along a control track 62 in the longitudinal direction of the tape.

Next, an operation at the time of a still picture reproduction will now be described in conjunction with FIG. 4.

For still-picture reproduction, the travel of the magnetic tape 18 is stopped, while the video heads 13a and 13b are rotated at the rotating speed which is the same as that at the time of recording or normal reproduction.

Figures 4, 5:
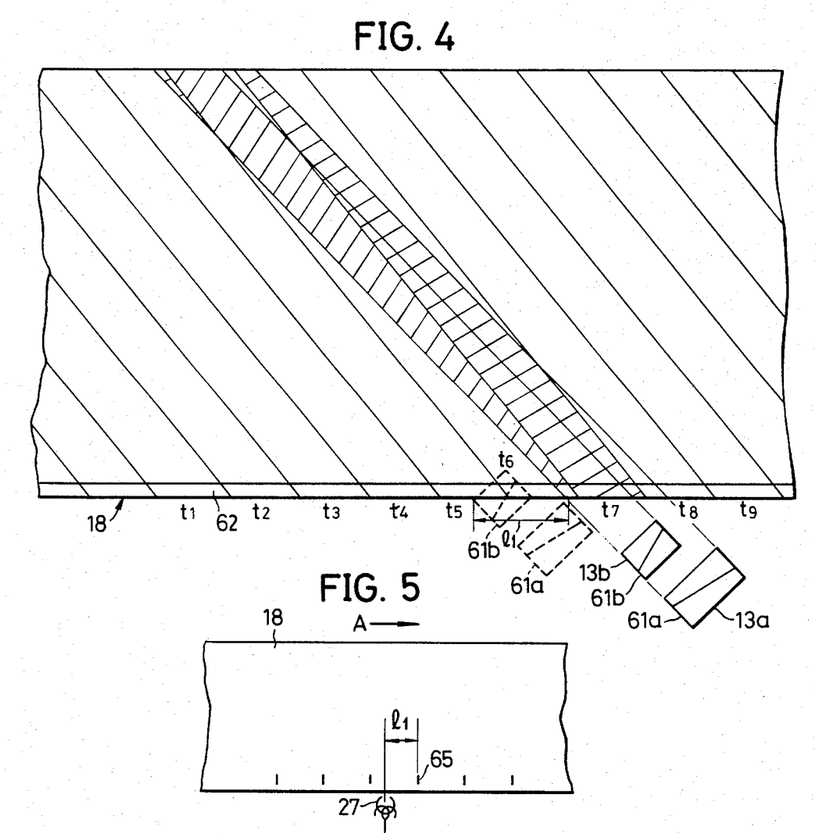
FIG. 4 is a diagram indicating the scanning track pattern at the time of still picture reproduction.
FIG. 5 is a diagram for explaining the relationship between the control head and the tape stopping position.

Referring to FIG. 4, when the head 13b, for example, starts to trace from a position at which it is staddling the tracks t6 and t7, it traces along the path indicated by bold full line and terminates its tracing at a position where it straddles the tracks t5 and t6. Since the tape 18 is stopped, the head 13a also, with its end face 61a tracing the same path as that of the end face 61b of the head 13b, starts to trace from a position where it straddles the tracks t6, t7, and t8 and ends its tracing at a position where it straddles the tracks t5, t6, and t7. Thereafter, the above described tracing operation is repeated.

The heads 13b and 13a have a normal tracking relationship to the tracks t6 and t7, respectively. Here, it will be supposed that the relative tracing positions of the heads 13a and 13b with respect to the tape are offset, for example, to the left from the states shown in the figure. In this case, the reproducing level at the time of starting of tracing of the track t6 by the head 13b increases, but the reproducing level at the time of completion of tracing decreases. Furthermore, the reproducing period of the maximum level of the head 13a with respect to the track t7 becomes short, and the proportions of the tracing of the track t5 at the time of completion of tracing with respect to the track t7 increases. For this reason, beat interference is produced in the joint portion between the signals reproduced by respective heads. On the other hand, when the relative tracing positions of the heads 13a and 13b are offset to the right from the states shown in the figure, the reproducing level decreases from the track t6 of the head 13b, and the signal to noise ratio at this reproducing portion deteriorates greatly. Therefore, the most desirable state of the tracing path of the heads 13a and 13b relative to the tracks at the time of still picture reproduction is that indicated in FIG. 4.

In the present embodiment of the invention, at a point where the control head 27 has reproduced the control signal, the video head 13a or 13b is at a position shown by dotted lines in FIG. 4, and the magnetic tape 18 stops after moving by a distance l1 from the above position of the video head.

When, in FIG. 1, with the system in the state of normal reproducing mode, the manipulation button (not shown) for still picture reproduction mode is pushed, the switches 28 and 41 are changed over and connected to their contact points S. At the same time, still picture reproduction mode signals are applied through a terminal 50 to a flip-flop 49 as trigger pulses to trigger the same. Thereafter, a control signal reproduced by the control head 27 is supplied by way of the switch 26 and the amplifier 44 to a monostable multivibrator 47, to trigger this monostable multivibrator 47 with the positive polarity pulse. The delay time constant of the monostable multivibrator 47 is adjusted by a variable resistor 48, and this monostable multivibrator produces as output a signal delayed by a time determined by this time constant. The output of the flip-flop 49 assumes a waveform determined by the trigger pulse from the above terminal 50 and the output of the monostable multivibrator 47.

The switch circuit 43 is switched to its contact point S in response to the output of the flip-flop 49. As a consequence, the signal from the capstan servo circuit 40 is supplied to the motor 20 until the switch 41 is switched. After the switch 41 is switched and until the switch circuit 43 is switched, the signal from the flip-flop 49 is supplied to the motor 20, which thus rotates to drive the magnetic tape 18. However, when the switch circuit 43 is switched, the motor 20 is grounded via the contact point S and stops and the magnetic tape stops traveling.

Thus, subsequent to the control manipulating for still picture reproduction mode, the magnetic tape 18 comes to a full stop at the end of a predetermined time (equal to the sum of the above delay time and the rotating time of the tape driving system including the capstan 19, due to momentum) from the detection of the control signal of negative polarity. The distance l1 described in connection with FIG. 4 is determined by this delay time, which in turn is adjusted in accordance with the delay time. Accordingly, the variable resistor 48 is so adjusted, and the delay time of the monostable multivibrator 47 is so adjusted that the distance from the detection of the control signal to the point at which the magnetic tape 18 comes to a full stop becomes the above mentioned desirable distance l1.

Next, the operation of carrying out slow motion reproduction with minimal noise and beats through the application of the principle of this optimum still picture reproduction will be described.

When the control manipulation for slow motion reproduction mode of operation is carried out, the switches 26, 28, and 36 in the system illustrated in FIG. 1 are connected to their respective contact points P, and the switch 41 is connected to its contact point S, while a switch 53 is closed. Furthermore, the frequency dividing ratio of a frequency divider 51, which is supplied with the output of the flip-flop 35, is set in accordance with the slow motion of the slow motion reproduction. For example, for ½ slow motion reproduction, the frequency division ratio is set at ½.

The output signal of the flip-flop 35 is subjected to ½ frequency division in the frequency divider 51, which thereby sends an output signal to a monostable multivibrator 52. The output of the monostable multivibrator 52 is supplied to the flip-flop 49 through the switch 53.

On the other hand, a control signal g reproduced by the control head 27 is supplied to the monostable multivibrator 47, which thereby supplies a signal to the flip-flop 49. The flip-flop 49 produces an output signal which assumes a waveform determined by the signal from the monostable multivibrator 52 and the signal from the monostable multivibrator 47.

During the high level period (2-field period) of the output signal from the flip-flop 49, the motor 20 rotates, and the magnetic tape 18 moves through a distance equal to twice the track pitch. Next, during the low level period (the succeeding 2-field period) of the signal, the switch circuit 43 is changed over to its contact point S, and the motor 20 stops, whereby the magnetic tape 18 is stopped. Similarly thereafter, the cyclic operation wherein the magnetic tape 18 moves by twice the track pitch and stops is repeated every 2-field period.

Then, when the average speed of the magnetic tape 18 at the time of its movement is the normal speed, a normal reproduced picture is obtained in a 2-field period, and a still picture is obtained in the succeeding 2-field period. Accordingly, as an overall average result, a slow motion reproduced picture of ½ speed is obtained. In this operation, at every instance of still picture reproduction every other 2-field period, the magnetic tape 18 stops at a position of minimal occurrence of noise and beats which is offset by the distance l1 from the position at the time of the control signal reproduction, similarly as in the aforedescribed still picture reproduction operation. For this reason, noise is not generated, of course, in the normal reproduction occurring every other 2-field period, and there is almost no generation of noise also in the still-picture reproduction occurring during the other every other 2-field periods. Therefore, a slow motion reproduced picture of good image quality without defects such as noise and beats is obtained.

In this connection, the frequency division of the frequency divider 51 is set in accordance with the slow motion ratio, and the still picture reproduction period is thereby set, whereby a slow motion reproduction of the desired speed is achieved. For example, for ⅓-speed slow motion reproduction, the frequency division ratio of the frequency divider 51 is set at ⅓. Then, the signal becomes one of high level during a 2-field period and one of low level during a 4-field period. As a result, normal reproduction is carried out during a 4-field period, whereby, as a whole, a slow motion reproduction of ⅓-speed is accomplished. Thus, the frequency dividing ratio of the frequency divider 51 is selected to 1/n (n is an integer) with respect to an 1/n-speed slow motion reproduction.

However, in the previously proposed system, the monostable multivibrators 55 and 56 shown in FIG. 1 are not provided. Furthermore, the distance between each track scanning terminal position of the heads 13a and 13b and the position of the control head 27 was set to a predetermined distance X in the previously proposed system.

On the other hand, during the moving period of the magnetic tape 18 upon the above described slow motion reproduction, the noise bar introduced upon reproduction of a reverse track moves from the upper part towards the lower direction in the television picture. When it is assumed that the above moving quantity of the magnetic tape is equal to the length l (hereinafter referred to as "one frame corresponding length", where one frame corresponding length is equal to two track pitch in the present embodiment of the invention) in which the control pulse is recorded for one period, there is one part (the relative position of the standard pulse of the control head 27 and the recording control pulse) within this length l where the noise bar is not introduced in the television picture. This is when the control head 27 is at a substantially intermediate position between the adjacent standard control pulse recording positions.

Upon stopping of the magnetic tape, it is necessary to quickly stop the capstan motor 20. In order to perform this quick stopping of the magnetic tape, it is necessary to reduce the inertia of the capstan system. However, when the inertia of the capstan system is reduced, there was a problem in that the wow and flutter introduced upon normal reproduction became undersirable. Hence, the inertia of the capstan system must be heavy to a certain extent, and the capstan motor can be stopped quickly if the tape speed upon intermittent moving of the tape is slow. However, when the tape speed upon intermittent moving of the tape is set too slow, the noise bar is introduced in the reproduced picture upon moving of the tape for one frame. Therefore, the tape speed must also be selected to a value within a predetermined range. Accordingly, even when the voltage applied to the motor 20 becomes zero at a specific time, that is, even when the terminals of the motor are short-circuited, the movement of the tape is not stopped immediately.

Therefore, when the control pulse is detected and the terminals of the capstan motor 20 are short-circuited immediately, the movement of the magnetic tape 18 is stopped in a state where the relative positional relationship is such that the control head 27 is positioned at a substantially intermediate position between the adjacent standard control pulse recording positions due to inertia. This stopping position of the tape is a position where the noise bar is not introduced, however, a function to vary the stopping position of the magnetic tape to a certain extent becomes necessary, considering the interchangeability of the tape and the like (the inconsistency in the value of the above predetermined distance and the like). This operation to vary the stopping position of the tape is performed by adjusting the time it takes from the detection of the tape until the terminals of the motor are short-circuited, by adjusting the time constant of the monostable multivibrator 47 by use of the variable resistor 48. Accordingly, in the above described previously proposed system, the variable adjustment could only be performed towards one direction since the position of the noise bar in the reproduced picture becomes invisible as the value of the time constant of the monostable multivibrator 47 approaches zero, and there was a disadvantage in that the above variable function was insufficient.

The above described problems are solved in the system according to the present invention, and description will now be given on the essential part of the system of the present invention. The monostable multivibrator 47 has a variable function for stopping the movement of the magnetic tape 18 at a position where the noise bar is substantially invisible in the reproduced picture. When the varying range is set to $\frac{1}{2}$ frame, for example, in a case where the time constant of the monostable multivibrator 47 is established at substantially the center value (at substantially the center position of the variable resistor 48) within the varying range of the time constant of the monostable multivibrator 47, the magnetic tape 18 is stopped when the control head 27 is at a position separated by a distance l1, that is, by $(\frac{1}{2}+\frac{1}{4})$ frame corresponding length, from a standard control pulse recording position 65 as shown in FIG. 5, upon intermittent moving of the tape during slow motion reproduction. It is assumed that the magnetic tape 18 stops after moving $\frac{1}{2}$ frame corresponding length, when the capstan motor 20 is stopped at the detection point of the standard control pulse. Thus, when still picture reproduction is performed in this tape stopping position, noise bar is generated at a part of the television picture which is approximately $\frac{1}{2}$ the length from the top part of the picture. However, in the present embodiment of the invention, in order to enable still picture reproduction in which the noise bar is not generated when the control head 27 is at a position separated by the above $(\frac{1}{2}+\frac{1}{4})$ frame corresponding length from the standard control pulse recording position, the control head 27 is provided at a position substantially deviated by $\frac{1}{4}$ frame corresponding length more than the above predetermined distance X towards the supply reel (not shown) side (towards the left-hand-side in FIG. 1). The distance between the control head and the drum is shown in $X_a$ in FIG. 1. Accordingly, the control head 27 stops after detecting the positive polarity pulse of the control signal, while the magnetic tape 18 stops after moving a distance equal to $(\frac{1}{2}+\frac{1}{4})$ frame corresponding length. Therefore, the magnetic tape 18 stops at a most suitable position shown in FIG. 4, where the noise bar is not introduced.

Since the control head 27 is provided at a position deviated by $\frac{1}{4}$ frame corresponding length more than the predetermined distance X, the adjustment of the tape stopping position can be performed by moving the slider of the variable resistor 48 towards the positive or the negative direction from the center position.

The control head 27 is provided at a position deviated by $\frac{1}{4}$ frame corresponding length more than the above predetermined distance X, however, the control signal f is delayed by $\frac{1}{4}$ frame with respect to the vertical synchronizing signal d by the monostable multivibrator 55 as described above upon recording. Hence, the positions of the recorded signals on the magnetic tape are the same as in a system other than the system according to the present invention. Moreover, interchangeability exists between the system according to the present invention and other systems, and reproduction can thus be performed also by an apparatus of the conventional system which does not use the system according to the present invention.

Further, upon normal reproduction, the monostable multivibrator 45 is triggered by the output of the monostable multivibrator 56, in order to compensate for the fact that the position of the control head 27 is deviated as described above.

Since the position of the control head is deviated, the audio output is produced $\frac{1}{4}$ frame in advance with respect to the video signal, upon interchanged reproduction. However, this time difference is approximately 7 mili-seconds in reality, and does not cause any problems from the practical point of view. In addition, this time difference is not introduced when recording and reproduction are performed by the same apparatus.

In the above described embodiment of the invention, the control pulse is formed by use of the vertical synchronizing signal d upon recording. However, since the vertical synchronizing signal and the rotation of the drum are in synchronism upon recording, the control pulse can be formed by use of the drum rotation detection pulse.

Figure 6:
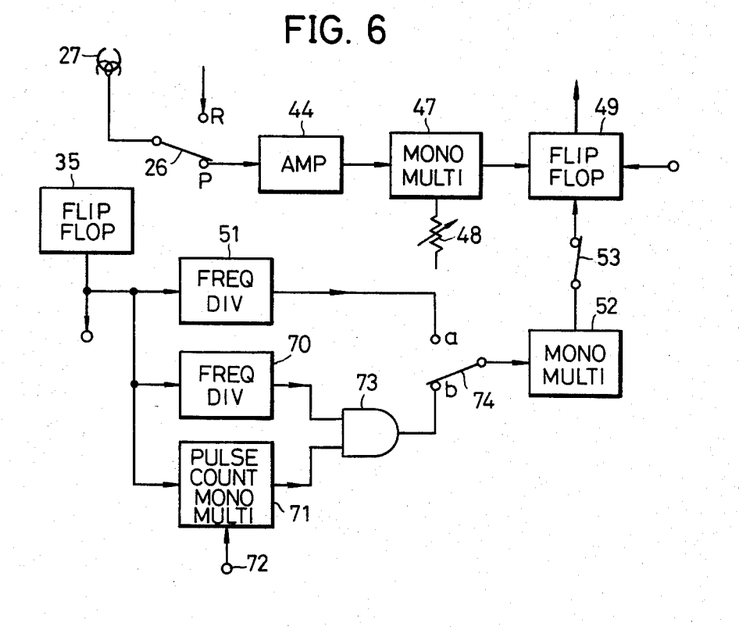
FIG. 6 is a systematic block diagram showing an essential part of a second embodiment of a system according to the present invention.
Figure 7:
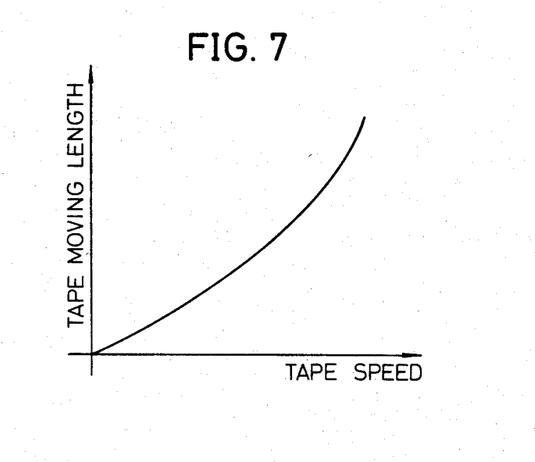
FIG. 7 is a diagram showing the relationship between the tape speed and the tape moving quantity.

Next, a second embodiment of a system according to the present invention will be described in conjunction with FIGS. 6 through 9. FIG. 6 is a systematic block diagram showing the essential part of the second embodiment of the system according to the present invention, and in FIG. 6, those parts which are the same as those corresponding parts in FIG. 1 are designated by like reference numerals, and their description will be omitted. As described above, when the control pulse is obtained and delayed by a specific time quantity, to short-circuit the terminals of the capstan motor 20 in a case where the reproduction mode is changed to a still picture reproduction mode from a reproduction mode such as normal reproduction and fast motion reproduction modes, the tape stopping position becomes various since the tape speed upon various modes differ. That is, the tape stopping position becomes various according to the tape moving distance between the time when the terminals of the capstan motor are short-circuited until when the magnetic tape stops, which is respective of the tape speed as shown in FIG. 7. In FIG. 7, the horizontal axis indicates the tape speed when the terminals of the capstan motor are short-circuited, and the vertical axis indicates the tape moving distance from the time when the above motor terminals are short-circuited until when the tape stops. Accordingly, in the above described case, there is a possibility that the noise bar is introduced in the reproduced picture.

The above described problem is overcome in the present embodiment of the system according to the present invention. In FIG. 6, a changeover switch 74 has contact points a and b, and the changeover switch 74 is connected on the side of the contact point a when the reproduction mode is changed from a slow motion reproduction mode to a still picture reproduction mode. When the reproduction mode is changed from a mode such as normal reproduction or fast motion reproduction modes to a still picture reproduction mode, the above changeover switch 74 is connected on the side of the contact point b. Description will now be given with respect to an example where the reproduction mode is changed from a normal reproduction mode to a still picture reproduction mode.

Figure 8:
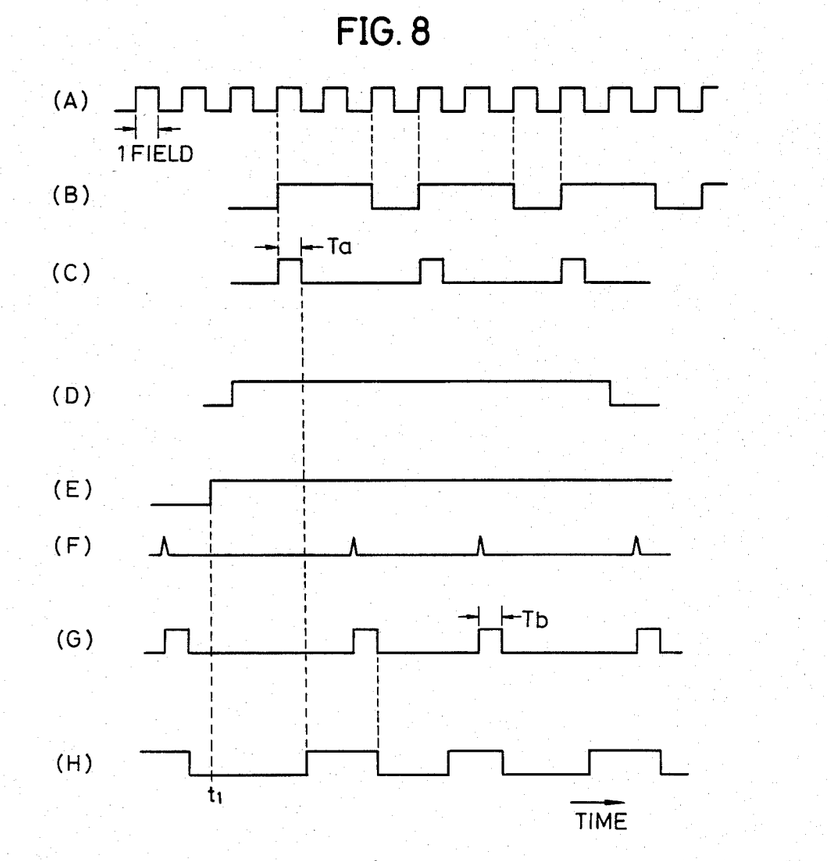
Figure 9:
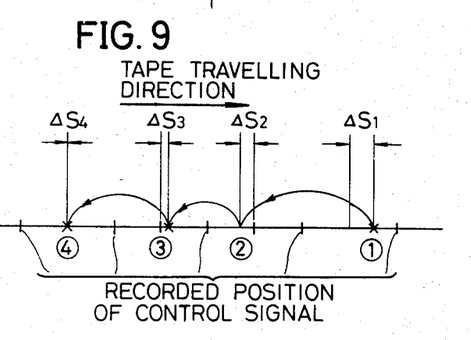
FIG. 9 is a diagram for explaining the tape stopping operation according to the system of the embodiment shown in FIG. 6.

A symmetrical square wave shown in FIG. 8(A) obtained from the flip-flop 35, which is in synchronism with the rotation of the rotary head and having a pulse width of one field, is supplied to frequency dividers 51 and 70 and a pulse counting monostable multivibrator 71. The frequency divider 70 divides the frequency of the incoming square wave into ⅓ the original frequency, for example, and applies a pulse shown in FIG. 8(B) to one of the input terminals of a two-input AND circuit 73. On the other hand, the pulse counting monostable multivibrator 71 is constructed to close after counting eight input symmetrical square waves supplied from the flip-flop 35, for example, when the mode signal supplied through an input terminal 72 is changed over into a high level (still picture reproduction mode) from a low level (normal reproduction mode) at time t1, as shown in FIG. 8(E). Therefore, the pulse counting monostable multivibrator 71 produces a pulse shown in FIG. 8(D), and applies this pulse thus produced to the other input terminal of the two-input AND circuit 73.

Accordingly, a pulse having a rising position which coincides with that of the output pulse of the frequency divider 70 shown in FIG. 8(B), is obtained from the above two-input AND circuit 73. This pulse obtained from the two-input AND circuit 73 is applied to the monostable multivibrator 52 through the changeover switch 74, to trigger this monostable multivibrator 52 with the rising edge of the above pulse.

Hence, a total of three pulses each having a pulse width $T_a$, as shown in FIG. 8(C), are obtained from the monostable multivibrator 52 every period of six fields, and these pulses are applied to the flip-flop 49 through the switch 53.

On the other hand, the control pulse reproduced by the control head 27, is applied to the monostable multivibrator 47 through the changeover switch 26 and the amplifier 44. The monostable multivibrator 47 is triggered by the positive polarity pulse of a reproduced control pulse shown in FIG. 8(F). This monostable multivibrator 47 produces a pulse having a pulse width $T_b$ as shown in FIG. 8(G), and applies this pulse thus obtained to the reset terminal of the flip-flop 49. As a result, the output of the above flip-flop 49 becomes a pulse shown in FIG. 8(H), and as explained in conjunction with FIG. 1, the capstan motor 20 in FIG. 1 is rotated during the period in which the above output pulse of the flip-flop 49 is of high level.

The tape stopping position where the noise bar is not generated, is when the control head 27 is positioned at the intermediate position between the adjacent standard control pulses (at the most suitable stopping position). However, in a case where still picture reproduction and moving of the tape in which the noise bar is not generated are alternately and repetitively performed as in a slow motion reproduction mode, the tape stopping position is adjusted to a position where the noise bar is not generated.

The capstan motor is rotated during the period in which the pulse shown in FIG. 8(H) is of high level, however, the rotation of the capstan motor varies according to the detected position of the control pulse during the above high level period of the pulse shown in FIG. 8(H). When the tape is stopped so that the control head 27 is at a position indicated by ① in FIG. 9 before regular still motion reproduction is initiated, for example, the deviation from the most suitable stopping position is $|\Delta S_1|$. Next, the tape is stopped at a position where the deviation from the most suitable stopping position is $|\Delta S_2|$ ($<|\Delta S_1|$), by advancing the picture by one frame. Thus, by performing similar intermittent advancement of the tape, the deviation from the most suitable stopping position becomes $|\Delta S_3|$ ($<|\Delta S_2|$), and then finally to $\Delta S_4$ ($=0$). Accordingly, the deviation from the most suitable position converges to zero, that is, to a most suitable stopping position where the noise bar is not generated.

In the present embodiment of the invention, the reproduction mode is changed over to the still picture reproduction mode after the slow motion reproduction is performed for a number of times. That is, for example, ⅓-speed slow motion reproduction is performed three times before the reproduction mode is changed over to the still picture reproduction mode. Therefore, the still picture reproduction is performed in which no noise bar is generated, within 0.3 to 0.4 seconds, by use of the pulse of 10 Hz obtained by frequency dividing the output of 30 Hz of the flip-flop 35 into ⅓ the original frequency.

In addition, when the reproduction mode is to be changed over to still picture reproduction mode from a slow motion reproduction mode, the still picture reproduction is performed from when the tape stops at the above most suitable stopping position in which no noise bar is generated, by intermittently advancing the tape, since the tape speed upon slow motion reproduction is slow.

Further, this invention is not limited to these embodiments but various variations and modifications may be made without departing from the scope of the invention.

What is claimed is:

1. A reproducing system for carrying out both a normal reproduction and a still-picture reproduction, said reproducing system comprising:

an elongated tape on which video signals are recorded in a frame format on video tracks extending obliquely with respect to the longitudinal direction of the tape, and on which a control signal is recorded along a control track extending in the longitudinal direction along the tape, said control track and said video tracks having a fixed spatial relationship with respect to each other along the length of said tape, said video tracks being recorded by a plurality of rotary video head means of a recording system, each of said video head means of the recording system having a gap with a mutually different azimuth angle, control head means in said recording system for recording said control signal along the control track, said control head means of said recording system being positioned at a first and pre-established location which is displaced from a certain location where said video heads of the recording system terminates scanning over a video track on the tape which is running away from the certain location, and said control head recording the control signal without subjecting the control signal to a time delay;

tape transport comprising a capstan rotated by a motor for driving or stopping said tape, said tape being driven to move at a speed which is identical to a moving speed of said tape at a time of recording during the normal reproduction and being stopped during the still-picture reproduction;

first reproducing means comprising a plurality of rotary video head means similar to said plurality of rotary video head means of the recording system for successively scanning over the recorded video tracks to pick up and reproduce the video signals recorded on said tracks, each of said plurality of rotary video head means of said first reproducing means having a gap with said mutually different azimuth angles similar to the gaps of said video head means of the recording system;

second reproducing means including control head means for reproducing the recorded control signal from the control track while the driven tape is moving, said control head means of said second reproducing means being positioned at a location which is displaced by a predetermined distance upstream on the tape with respect to said pre-established location of said control head means of the recording system;

variable delay means enabled only at the time of still-motion reproduction for delaying the reproduced control signal by a first delay time, said first delay time being variable within a specific range so that a reproduced video signal output becomes a minimum value within a vertical blanking period in the video when said rotary video head means of said first reproducing means are actively scanning over said tape at a position where the tape finally stops after having moved due to inertia of said tape transport means; said inertia occurring while the tape is being stopped after said first delay time responsive to said reproduced control signal in order to carry out a still-picture reproduction; and fixed delay means only at the time of normal reproduction for delaying the reproduced control signal by a second delay time during the normal reproduction, said second delay time corresponding to the time required for said tape to move said predetermined distance to compensate for a time advancement of the reproduced control signal caused by the control head means of said second reproducing means displaced upstream of the tape by said predetermined distance.

2. A reproducing system as claimed in claim 1 in which one field of video signals is recorded in each of the video tracks on said tape, said control track has a control signal recorded thereon for every two video tracks, whereby one control signal is recorded for every one frame of the recorded video signal, and in which said predetermined distance corresponds to the length of said tape which is required to store one quarter of said recorded frame.

3. A reproducing system as claimed in claim 2 in which said first delay time is variably adjusted with respect to a delay time corresponding to the time required to reproduce one quarter frame.

4. A reproducing system as claimed in claim 1 in which said control head records said control signal on said control track after being delayed by a delay time according to the positional displacement of said control head.

5. A reproducing system as claimed in claim 1 in which said specific range within which said first delay time is variable is equal to or greater than twice said second delay time.

6. A reproducing system for carrying out a normal reproduction and a slow-motion reproduction, said reproducing system comprising:

an elongated tape on which video signal, are recorded in a frame format on video tracks extending obliquely with respect to the longitudinal direction of the tape and on which a control signal is recorded along a control track extending in the longitudinal direction of the tape, said control track and said video tracks having a fixed special relationship with respect to each other along the length of said tape, said video tracks being recorded by a plurality of rotary video head means of a recording system, each of said video head means of the recording system having a gap with a mutually different azimuth angle, said control signal being recorded along the control track by control head means of the recording system, said control head means of the recording system being positioned at a pre-established location which is separated by a pre-established distance measured downstream of the tape from a certain position where one of said video head means of the recording system terminates scanning over a video track on the tape which is running away from the certain position and said control head means recording the control signal without a time delay;

tape transport means comprising a capstan rotated by a motor for driving or stopping said tape, said tape being driven to move at a speed which is identical to a moving speed of said tape at a time of recording during the normal reproduction and being stopped intermittently during the slow-motion reproduction;

first reproducing means comprising a plurality of rotary video head means similar to said plurality of rotary video head means of the recording system for successively scanning over the recorded video tracks to pick up and reproduce the recorded video signals recorded on said video tracks, each of said rotary video head means of said first reproducing means having a gap with mutually different azimuth angles similar to the gaps of said video heads in said recording system;

second reproducing means comprising said control head means for reproducing the recorded control signal from the control track while the driven tape is moving, said control head means of said second reproducing means being positioned at a location which is displaced upstream of the tape by a predetermined distance with respect to said pre-established location of said control head means of the recording system;

switching means for supplying and cutting off electric power to the motor;

switching signal producing means for producing a switching signal to operate the switching means to cut off and supply the electric power to the motor, in response to a slow-motion reproduction mode command signal, said switching signal producing means comprising variable delay means which are enabled only at the time of slow-motion reproduction for delaying the reproduced control signal by a first delay time, said first delay time being variable within a specific range so that a reproduced video signal output becomes a minimum value within a vertical blanking period in the video signal when said rotary video head means of said first reproducing means are actively scanning over said tape at a position where the tape finally stops after inertia of said tape transport means which is triggered intermittently to stop responsive to said reproduced control signal after said first delay time;

rotation detecting means for detecting the rotation of said rotary video head means of said first reproducing means;

frequency dividing means for frequency-dividing the detected output signal of said rotation detecting means;

means for producing a voltage having a waveform which varies in accordance with the output signal from said frequency dividing means and the reproduced control signal delayed by said first delay time; and fixed delay means enabled only during normal reproduction for delaying the reproduced control signal by a second delay time, said second delay time corresponding to said predetermined distance, to compensate for a time advancement of the reproduced control signal which is caused by the control head means of said second reproducing means being displaced upstream of the tape by said predetermined distance.

7. A reproducing system as claimed in claim 6 in which said specific range within which said first delay time is variable is equal to or greater than twice said second delay time.

8. A reproducing system as claimed in claim 6 in which one field of video signal is recorded in each of the video tracks on said tape, a control signal is recorded on said control track for every two video tracks, whereby a control signal is recorded for every one frame of the recorded video signal, and said predetermined distance corresponds to the length of said tape which is required to store one-quarter of a recorded video frame.

9. A reproducing system as claimed in claim 8 in which said first delay time is variably adjusted with respect to a delay time corresponding to a time required to reproduce one quarter frame.

10. A recording and reproducing system capable of carrying out both a normal reproduction and a still-picture reproduction, said recording and reproducing system comprising:

first recording means comprising a plurality of rotary video head means for recording video signals in a frame format on video tracks extending obliquely across the width of a tape, each of said video head means having a gap with a mutually different azimuth angle;

second recording means comprising a control head means and a delay means for recording a control signal along a control track extending in a longitudinal direction along the length of the tape, said control head means being positioned at a location which is separated by a certain distance measured in a downstream direction along the length of said tape from a certain position where one of said video head means terminates scanning over a video track on the tape which is running away from the certain position, said location of said control head means being displaced upstream of the tape by a predetermined distance with respect to an industry standard location of said control head means, said delay means being enabled only at the time of recording for delaying the recording of said control signal by a first delay time period corresponding to the time required for said tape to travel over the predetermined distance to compensate for the pickup control signal time advancement caused by the displaced location of said control head means with respect to said industry standard location so that a recording pattern formed on the tape by said control head means is identical to a recording pattern formed by control head means positioned at said industry standard location;

tape transport means comprising a capstan rotated by a motor for driving or stopping said tape, said tape being driven to move at a speed which is identical to a moving speed of said tape at a time of recording during the normal reproduction and being stopped during the still-picture reproduction;

first reproducing means for successively scanning over the video tracks recorded by said video head means to pickup and reproduce the video signals recorded on said video tracks;

second reproducing means comprising a control head means for reproducing the recorded control signal from the control track while the driven tape is moving;

variable delay means enabled only at the time of the still-picture reproduction for delaying the reproduced control signal by a second delay time, said second delay time being variable within a specfic range so that a reproduced video signal output becomes a minimum value within a vertical blanking period in the video signal when said video head means are actively scanning over said tape at a position where the tape finally stops after coasting responsive to an inertia of said tape transport means, said tape transport means being triggered to stop responsive to said reproduced control signal after said second delay time; and fixed delay means enabled only at the time of the normal reproduction for delaying the reproduced control signal by a third delay time, said third delay time corresponding to the time required for the tape to travel over said predetermined distance to compensate for a time advancement of the pickup of said reproduced control signal caused by the displaced location of said control head means with respect to said industry standard location.

11. A recording and reproducing system capable of carrying out a normal reproduction and a slow-motion reproduction, said recording and reproducing system comprising;

first recording means comprising a plurality of rotary video head means for recording video signals in a frame format on video tracks extending obliquely across the width of the tape, each of said video head means having a gap with mutually different azimuth angle;

second recording means including a control head means and a delay means for recording a control signal on a control track extending along the longitudinal direction of the tape, said control head means being positioned at a location which is separated from a certain position by a certain distance in a downstream direction of the tape, said certain position being where one of said video head means terminates scanning over a video track on the tape while it is running away from the certain position, said location of said control head means being displaced upstream of the tape by a predetermined distance with respect to an industry standard location of said control head means, said delay means being enabled only at the time of recording and delaying the recording control signal by a first delay time corresponding to the time period required for said tape to travel said predetermined distance to compensate for a time advancement of the recording control signal caused by its pickup at the displaced location of said control head means with respect to said industry standard location so that a recording pattern formed on the tape by said control head means is identical to a recording pattern formed by control head means positioned at said industry standard location;

tape transport means comprising a capstan rotated by a motor for driving or stopping said tape, said tape being driven to move at a speed which is identical to a moving speed of said tape at a time of recording during the normal reproduction and being stopped intermittently during the slow-motion reproduction;

first reproducing means for successively scanning over the video tracks recorded by said video head means to pickup and reproduce the video signals recorded on said video tracks;

second reproducing means for reproducing when the driven tape is moving the control signal recorded on the control track by said control head means;

switching means for supplying and cutting off electric power to the motor;

switching signal producing means for producing a switching signal to operate the switching means to cut off and supply the electric power to the motor in response to a slow-motion reproduction mode command signal, said switching signal producing means comprising variable delay means enabled only at the time of slow-motion reproduction for delaying the reproduced control signal by a second delay time, said second delay time having variable within a specific range so that a reproduced video signal output becomes a minimum value within a vertical blanking period in the video signal when said video head means are actively scanning over said tape at a position where the tape finally stops after coasting responsive to an inertia of said tape transport means, said tape being triggered to stop intermittently in response to said reproduced control signal after it has been delayed by said second delay time;

rotation detecting means for detecting the rotation of said video head means;

frequency dividing means for frequency-dividing the detected output signal of said rotation detecting means;

means for producing a voltage having a waveform which varies in accordance with the output signal from said frequency dividing means and the reproduced control signal delayed by said second delay time; and fixed delay means enabled only at the time of the normal reproduction for delaying the reproduced control signal by a third delay time, said third delay time corresponding to the time required for the tape to travel over said predetermined distance to compensate by introducing a time advancement of the reproduced control signal caused by the displaced location of said control head means with respect to said industry standard location.

* * * * *

UNITED STATES PATENT AND TRADEMARK OFFICE
CERTIFICATE OF CORRECTION

PATENT NO. : 4,510,533
DATED : April 9, 1985
INVENTOR(S) : YOSHIO TOKUYAMA

It is certified that error appears in the above-identified patent and that said Letters Patent is hereby corrected as shown below:

Claim 1, Column 14, line 64, between "transport" and "comprising" insert --means--.

Claim 11, Column 19, line 26, change "when" to --while--.

Signed and Sealed this

Tenth Day of September 1985

[SEAL]

Attest:

DONALD J. QUIGG

Attesting Officer      Acting Commissioner of Patents and Trademarks - Designate